United States Patent [19]

Blanscet

[11] Patent Number: 4,846,228
[45] Date of Patent: Jul. 11, 1989

[54] SURGE ELIMINATOR

[76] Inventor: Roy G. Blanscet, 2108 N. Zimmers, Pampa, Tex. 79065

[21] Appl. No.: 181,492

[22] Filed: Apr. 14, 1988

[51] Int. Cl.[4] .................... F16L 55/04; F01N 01/08
[52] U.S. Cl. ................................ 138/26; 181/206; 181/265
[58] Field of Search ............... 138/26, 30; 181/249, 181/250, 251, 254, 265, 266, 234, 240; 137/207, 568, 593

[56] References Cited

U.S. PATENT DOCUMENTS

| | | | |
|---|---|---|---|
| 2,618,354 | 11/1952 | Hedrick | 181/206 |
| 2,707,033 | 4/1955 | Moerke et al. | 138/26 |
| 3,107,748 | 10/1963 | Placek | 181/266 |
| 3,512,607 | 5/1970 | Hubbell | 181/265 |
| 3,741,336 | 6/1973 | Mslosh | 181/266 |
| 3,827,531 | 8/1974 | Hansen | 181/265 |
| 4,124,092 | 11/1978 | Kajiya et al. | 181/265 |
| 4,637,491 | 1/1987 | Fukuda | 181/265 |

FOREIGN PATENT DOCUMENTS

| | | | |
|---|---|---|---|
| 1086090 | 4/1954 | France | 181/265 |
| 4632374 | 6/1969 | Japan | 181/265 |
| 454537 | 6/1968 | Sweden | 181/265 |

Primary Examiner—James E. Bryant, III
Attorney, Agent, or Firm—Ross, Howison, Clapp & Korn

[57] ABSTRACT

A surge eliminator includes a longitudinal cylindrical housing (10) with rounded ends (12) and (14). Fluid flows into inlet chamber (20) and through pipes (34) to a first dampening chamber (22). The fluid then flows from the chamber (22) to a chamber (24) through pipes (36). Fluid then flows from chamber (24) to an outlet chamber (26) through orifices (38) to an outlet (18). The fluid is continually oriented such that it must turn 180° from the inlet to the outlet in each of the dampening chambers.

3 Claims, 1 Drawing Sheet

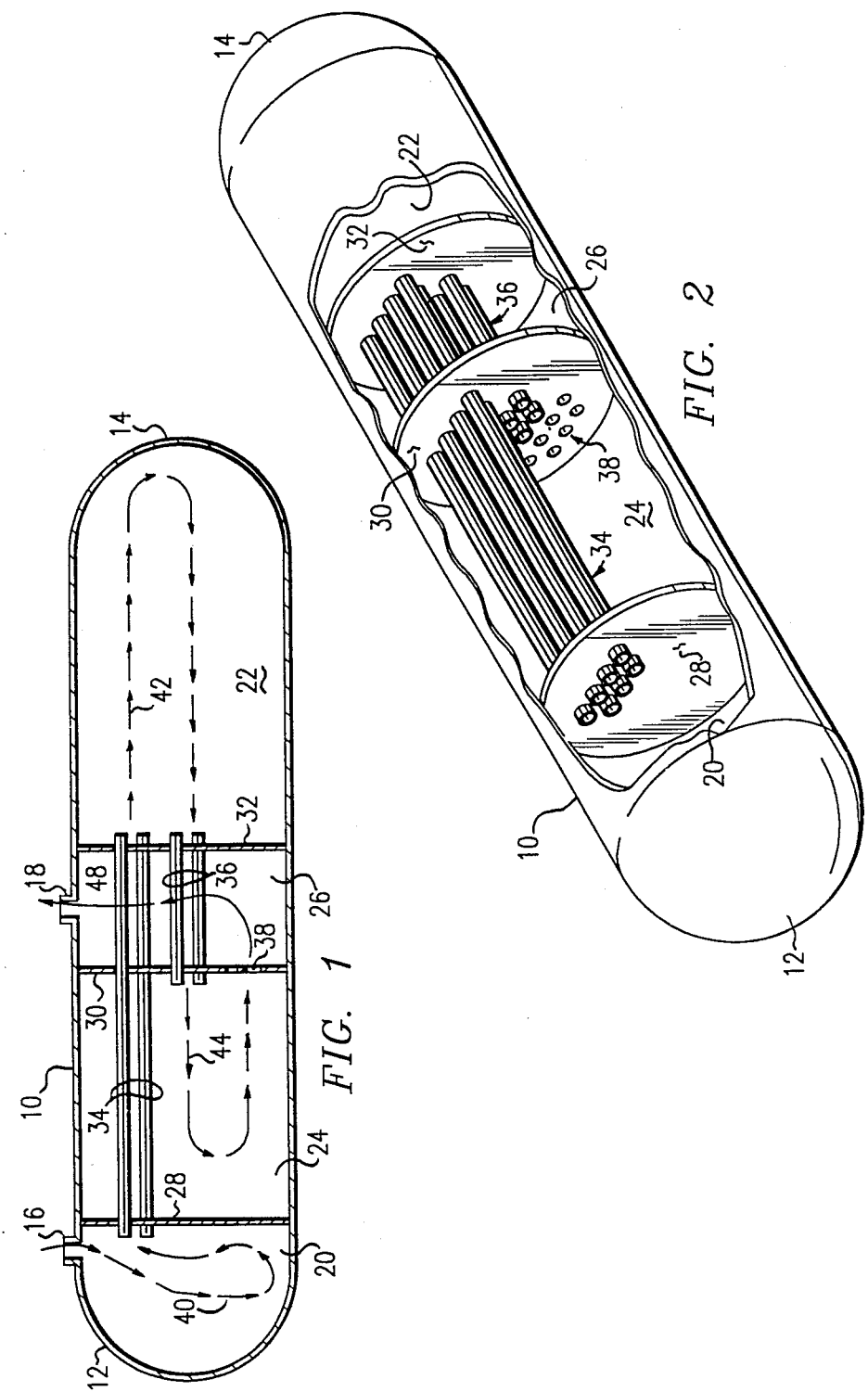

SURGE ELIMINATOR

TECHNICAL FIELD OF THE INVENTION

The present invention pertains in general to accumulator type devices, and more particularly to a surge eliminator that does not utilize bladders and/or mechanical moving devices.

BACKGROUND OF THE INVENTION

When dealing with high volume, high pressure fluid systems, it is necessary to account for surges in order to insure that pressure surges and the like do not damage plumbing equipment, couplings, etc. The use of accumulator type devices with various gas filled bladders is well-known to solve this problem.

Accumulators utilizing bladders with a gas disposed therein at a predetermined pressure are prone to damage as they have moving parts that wear out. In addition, there are other types of mechanical type accumulators which also have the same problem in that they have a number of moving parts. An accumulator in general is utilized to allow for expansion of the fluid whenever there is a surge and thereby provide a dampening effect. Generally, the accumulators are also utilized to provide an expansion chamber. However, when utilized to dampen surges, the overall movement of the accumulator is minimal since only a small amount of movement is required to relieve a given amount of pressure. This is due to the fact that with fluid systems a relatively incompressible fluid is being passed through the system. One type of system that utilizes an accumulator of this type is used to eliminate "water hammer". This type of device is typically disposed in series with the water line such that when taps and the such are closed off after water has been running, the termination of flow does not result in impact on the overall system. This generally is a spring actuated piston type device.

In view of the above disadvantages with present accumulators and mechanical type dampening devices, there exists a need for a dampening device without mechanical moving parts.

SUMMARY OF THE INVENTION

The present invention disclosed and claimed herein comprises a surge eliminator which includes a plurality of dampening chambers disposed in a cylindrical housing. The cylindrical housing has a first input chamber defined by a baffle plate disposed perpendicular to the longitudinal axis of the housing. A first dampening chamber is formed by a second baffle plate disposed at the end of the housing and a second dampening chamber is formed by a baffle plate disposed between the first and second baffle plates and proximate to the input chamber. An output chamber is provided between the first and second dampening chamber. A first plurality of longitudinal pipes is disposed between the input chamber and the first dampening chamber and a second plurality of pipes are provided for communicating between the first and second dampening chamber. Orifices in the baffle plate between the second dampening chamber and the output chamber provide a communication therebetween. An input port is provided for directing flow perpendicular to the flow through the first set of longitudinal pipes with the second set of pipes being parallel to the first set of pipes such that fluid flow is required to traverse at an angle of approximately 180°.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a cross-sectional view of the surface structure of the present invention showing the fluid flow therethrough; and FIG. 2 illustrates a perspective cut-away view of the surge eliminator of the present invention.

DETAILED DESCRIPTION OF THE INVENTION

Referring now to FIG. 1, there is illustrated a cross-sectional diagram of the surge eliminator of the present invention. The surge eliminator essentially consists of a cylindrical housing 10 having rounded closed off ends 12 and 14. In the preferred embodiment, the overall length of the surge eliminator is approximately 80.5 inches. An inlet 16 is provided on the peripheral surface of the cylindrical housing 10 proximate to the rounded off end 12 and an outlet 18 is provided on the periphery of the cylindrical housing 10 approximately midway between the rounded off end 12 and the rounded off end 14.

Four chambers are defined within the surge eliminator of the present invention. They are the inlet chamber 20, the first dampening chamber 22, the second dampening chamber 24 and the outlet chamber 26. The inlet chamber 20 is disposed proximate to the rounded off end 12 and is separated from the second dampening chamber 24 by a baffle 28. The outlet chamber 26 is separated from the second dampening chamber 24 by a baffle 30. The outlet chamber 26 is separated from the first dampening chamber 22 by a baffle 32. The first dampening chamber 22 is proximate to the rounded end 14. In the preferred embodiment, the inlet chamber 20 is approximately 13 inches, the first dampening chamber 22 is approximately 31 inches, the second dampening chamber 24 is approximately 24 inches and the outlet chamber 26 is approximately 12 inches, each measured proximate to the longitudinal access of the surge eliminator.

A plurality of longitudinal pipes 34 are disposed between the inlet chamber 20 and the first dampening chamber 22 and extend through baffles 28, 30 and 32 and are sealed with respect to the baffles such that fluid does not communicate between adjacent chambers. In a similar manner, a plurality of longitudinal pipes 36 are disposed between the chamber 24 and the chamber 22 extending through baffles 30 and 32 and sealed with respect thereto. The pipes 36 and the pipes 34 each extend to the surface of the baffle on the chamber side of the chambers that they communicate with. The baffle 30 has a plurality of orifices 38 disposed therethrough to allow the dampening chamber 24 to communicate with the outlet chamber 26.

In operation, fluid flows downward into the inlet chamber 12 at an angle perpendicular to the direction of the pipes 34. The fluid circulates around the inner chamber 20 and into one end of the pipes 34, as illustrated by a plurality of flow arrows 40. The fluid then flows out the other end of the pipes 34 into the dampening chamber 22 and circulates around the chamber primarily being deflected off the rounded end 14 and then into one end of the pipes 36. This is illustrated by flow arrows 42. The fluid then flows out of the opposite end of the pipes 36 and into the second dampening chamber 24. This fluid flows outward and impinges upon the surface of the baffle 28 and then back toward the orifices 38 and into the outlet chamber 26. The fluid flow in the second dampening chamber 24 is illustrated by flow arrows 44. The fluid in the outlet chamber 26 flows upward past the pipes 36 and 34 that run through the outlet chamber 26 and out the outlet 18. It is important to note that the fluid of the outlet 18 is disposed at right angles to the fluid flow through orifices 38, such that the fluid must impact the baffle 32 and then move upward toward the outlet 18. This is represented by flow arrows 48.

Although not entirely understood, it is believed the frictional forces provided by the surface areas of the pipes 34 and 36 resulting from the fluid flow over the surface thereof and also the requirement that the fluid must circulate 180° in dampening chambers 22 and 24 and 90° in chambers 20 and 26 provides the dampening effect. Although no expansion is provided, thus requiring no moving parts, this dampening causes a reduction in the surge pressure between the inlet 16 and the outlet 18. In addition, the fluid in the outlet chamber 12 must flow upward past the outer surface of the pipes 36 and 34, thus introducing additional friction into the flow path.

Referring now to FIG. 2, there is illustrated a perspective cutaway view of the surge eliminator, wherein like numerals refer to like parts in the two figures. It can be seen that there are approximately seven pipes 34 and seven pipes 36. In the preferred embodiments, each of the pipes has an inside diameter of approximately 1.25 inches. There are illustrated seven orifices 38. By utilizing a larger number of pipes as compared to one large pipe, a given surface area is provided for fluid flow with respect to the crosssectional surface area of the pipes as a whole, whereas the surface area on the walls of the pipe that provides resistance to fluid flow is significantly increased. This resistance in addition to the fact that the fluid is relatively incompressible and not totally incompressible provides the dampening effect.

In summary, there is provided a surge eliminator which includes a plurality of dampening chambers. Each dampening chamber causing the fluid to flow at an angle of 180° from entrance to exit are provided between an inlet port and an outlet port. The chambers are disposed such that an inlet chamber is disposed next to a second baffle chamber with an outlet chamber disposed next to the second baffle in a dampening chamber and a first dampening chamber disposed adjacent the outlet chamber. Pipes are provided for communicating between the inlet chamber and the first dampening chamber and pipes are provided for communicating between the first dampening chamber and pipes are provided for communicating between the first dampening chamber and the second dampening chamber. Orifices are disposed between the separating member separating the second dampening chamber to allow fluid flow therebetween and out through an outlet port.

Although the preferred embodiment has been described in detail, it should be understood that various changes, substitutions and alterations can be made therein without departing from the spirit and scope of the invention as defined by the appended claims.

What is claimed is:

1. A surge eliminator, comprising:
   a cylindrical housing;
   said cylindrical housing having a first cap on one end thereof having the interior surface thereof concave and a second cap disposed on the opposite end thereof having the interior surface thereof concave;
   a first baffle plate disposed at said cylindrical housing perpendicular to the longitudinal axis thereof proximate to said first end to form an input chamber;
   a second baffle plate disposed in said cylindrical chamber proximate the second end thereof and disposed perpendicular to the longitudinal axis thereof to form a first dampening chamber;
   a third baffle plate disposed between said first and second baffle plates and perpendicular to the longitiudinal axis of said housing to form a second dampening chamber proximate to said first baffle plate on one side of said third baffle plate and to form an outlet chamber proximate to said second plate on the opposite side of said third baffle plate;
   first means disposed between said first and second baffle plates and extending through said third baffle plate for allowing said input chamber to communicate with said first dampening chamber;
   second means disposed bedtween said second and third baffle plates for providing communication between said first and second dampening chambers;
   said third baffle plate having orifices disposed therethrough for allowing said second dampening chamber to communicate with said outlet chamber;
   an inlet port disposed on the surface of said cylindrical housing and in communication with said input chamber with the fluid flow therethrough approximately perpendicular to the fluid flow through said first means; and
   an outlet port disposed on said cylindrical housing and in communication with said outlet chamber.

2. The surge eliminator of claim 1 wherein said first and second means each comprise a plurality of longitudinal pipes.

3. The surge eliminator of claim 2 wherein said orifices are disposed at the diameterically opposite side of said third baffle plate from said outlet port, the plurality of pipes of said first means and the plurality of pipes of said second means disposed between the fluid path of the orifices in said third plate and said outlet port.

* * * * *